Dec. 31, 1968　　　　W. H. PETERSON　　　　3,418,964
ACCELERATION INDICATING DEVICE
Filed Dec. 12, 1966　　　　　　　　　　　　　　Sheet 1 of 2

INVENTOR
WILLIAM H. PETERSON
BY *Fred P. Kostka*
ATT'Y.

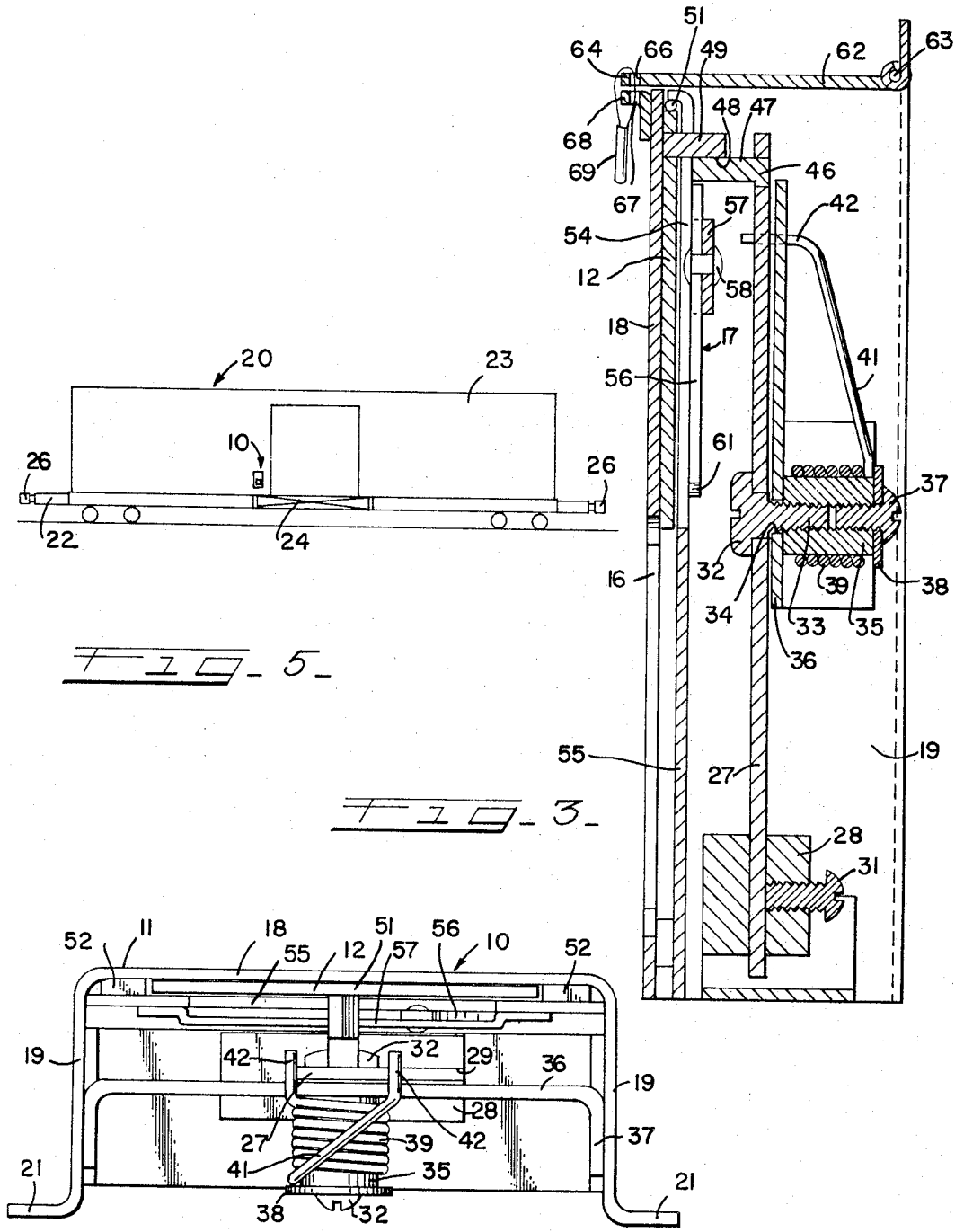

United States Patent Office 3,418,964
Patented Dec. 31, 1968

3,418,964
ACCELERATION INDICATING DEVICE
William H. Peterson, Homewood, Ill., assignor to Pullman Incorporated, Chicago, Ill., a corporation of Delaware
Filed Dec. 12, 1966, Ser. No. 601,040
11 Claims. (Cl. 116—114)

ABSTRACT OF THE DISCLOSURE

The present invention relates to a device for indicating the presence of a preselected acceleration which may be applied to a mass on which the device is adapted to be mounted. The indicating device comprises generally an indicating member which is restrained against the force of gravity in a position corresponding to the accelerations below the preselected accelerations. Restraining the indicating member against the force of gravity is a pendulum which is mounted to swing about its pivot at acceleration substantially equal to or above the preselected accelerations. When the pendulum swings, the indicating member is released so as to move to a position under the influence of gravity indicating the latter high accelerations. The device may again be manually reset so that the indicating member is again restrained by the pendulum.

Summary of the invention

The indicating device more specifically comprises essentially a casing having an opening. Mounted in the casing is a vertically movable plate member which is held in a raised invisible position when the acceleration is below the preselected acceleration. When the mass is accelerated above the preselected acceleration the plate member moves to a visible position in the opening. An acceleration determining member in the form of a pendulum which is mounted for swinging movement in a plane parallel to the application of the acceleration is disposed in the casing and is yieldably held against pivotal movement at acceleration below the preselected acceleration. The pendulum is operably connected to the plate member and holds the plate member in its invisible position when the pendulum is stationary. Upon swinging movement of the pendulum at accelerations equal to or above the preselected acceleration, the plate is released and drops to the visible position.

The invention is intended to be used in moving masses, such as railway vehicles and the like, that are subject to accelerations which create forces tending to cause damage. In the current railway vehicle there is frequently employed a cushioned underframe construction wherein a cushion unit for absorbing impact forces is disposed between a sliding sill and an underframe. The indicating device of the present invention, when applied to a railway vehicle of the cushioned underframe type, serves to indicate when the cushioning unit is inoperative. This occurs because when the cushioning unit is inoperative the accelerations will be such as to release the warning plate from its invisible to its visible position. Thereafter, the vehicle may be removed from service to repair the cushioning unit and the indicating device unit.

Description of invention

Figure 1:
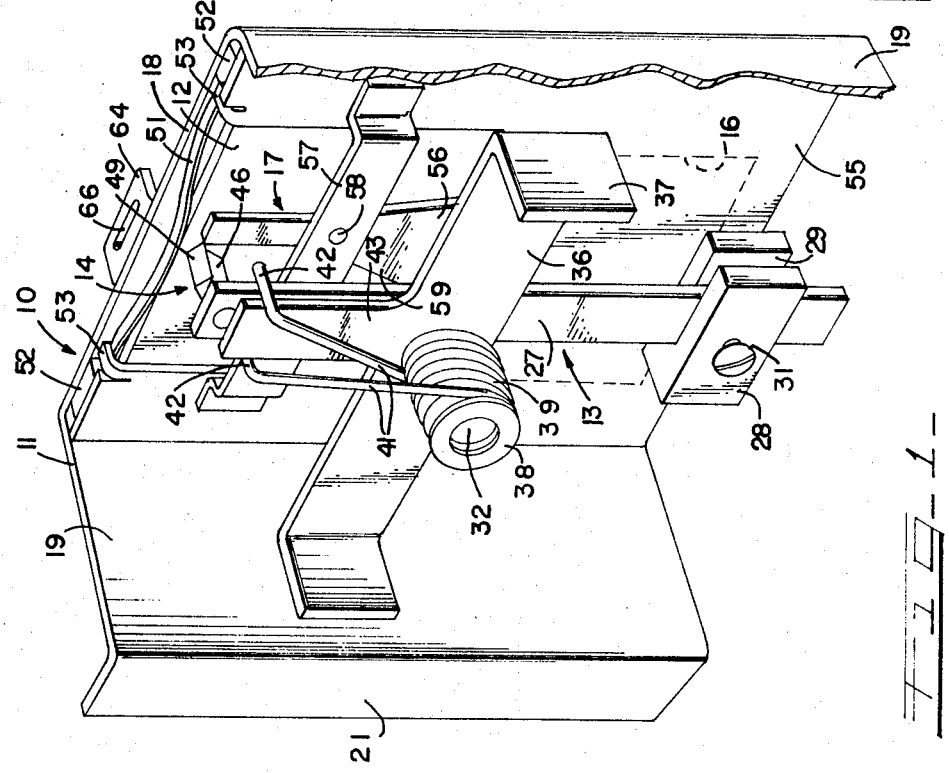
Figure 2:
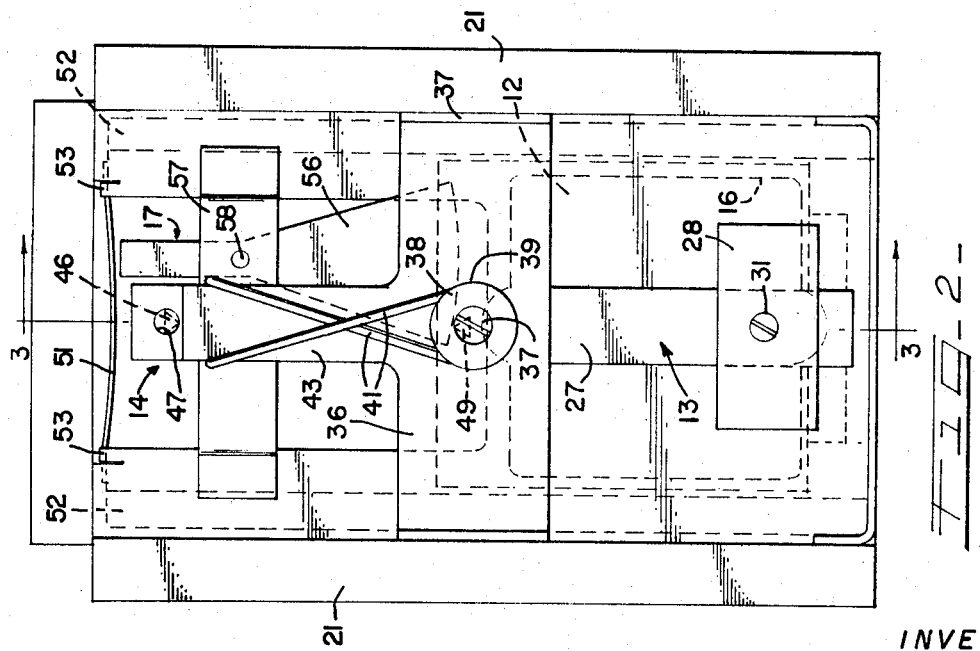

In the drawings:
FIG. 1 is a perspective view of the indicating device embodying the principles of the present invention with some of the casing being broken away to show underlying details of structure;
FIG. 2 is a rear elevational view of the indicating device;
FIG. 3 is a cross sectional view taken generally along the lines 3—3 of FIG. 2;
FIG. 4 is a top view of the indicating device; and
FIG. 5 is a view of the indicating device applied to the body of a cushion underframe railway vehicle.

Referring now to the drawings, the indicating device 10 comprises generally an outer casing 11 on which there is mounted a signal or indicating plate 12 and a pendulum 13 operatively connected thereto by a latching arrangement 14. The pendulum 13 is mounted for yielding swinging movement in the direction of the acceleration applied thereon only above a predetermined magnitude of acceleration. When the predetermined magnitude of acceleration is equaled or exceeded, the pendulum 13 swings so that the latching arrangement 14 between the plate 12 and the former is released so that the plate 12 falls under the influence of gravity to a position over an opening 16 formed in the casing 11. When the plate 12 is in the opening 16 and visible, the presence of high or excessive accelerations is indicated. Associated with the signal plate 12 and the pendulum 13 is an antitampering arrangement 17 requiring that a top cover plate 62 on the casing be opened before the signal plate 12 can be returned to its visible or non-signaling position.

More particularly, the casing 11 of the present invention is of substantially hat-shaped section including a horizontal web 18 having two vertically depending legs 19 from which there extend two outwardly projecting flanges 21. The casing 11 is attached to the mass onto which the acceleration indicator is adapted to be applied by means of the flanges 21 which may be secured to the mass by way of bolts or welding as shown in FIG. 5 wherein the mass is in the form of a railway vehicle 20. The casing 11 is mounted so that the horizontal web 18 lies parallel with the direction of the acceleration which may be applied to the mass, which in the railway vehicle 20 would be parallel to the longitudinal axis thereof.

The railway vehicle 20 is of the cushion underframe type including a sliding sill 22 mounted for lengthwise movement of the car body 23 and having a cushion unit 24 interposed therebetween for cushioning the force of impact imposed on the couplers carried by the sliding sill 22. When the cushioning unit is inoperative, the force of impact will be imposed on the vehicle body causing the latter to be accelerated at a rate in excess of that which occurs when the cushion unit is operative. Accordingly, the pendulum 13 of the indicating device 10 is mounted on the casing 11 so as to be in longitudinal alignment with the direction of the acceleration applied on the couplers 26 of the railway vehicle. To this end, the casing 11 is mounted on one of the sides of the railway vehicle so that when the sliding sill moves relative thereto in the usual manner, the indicating device will sense the acceleration transmitted to the vehicle when the sill reaches its full length of travel. Thus, under conditions in which the cushion unit 24 interposed between a sliding sill 22 and the car body 23 for some reason becomes inoperative, the acceleration transmitted to the car body will be in excess of that when the cushion unit 24 is in effective operation. Under these conditions, the indicating device 10 is arranged to provide a visible signal showing the inoperativeness of the cushion unit 24.

The indicating member or plate 12, as heretofore described, is slidably disposed for vertical movement adjacent the horizontal web 18 of the casing 11 and is movable between a raised position as shown in FIGS. 1 and 2 and a lower position in alignment with the opening 16. Holding the plate in its raised position is the pendulum 13 including an arm 27 having a mass in the form of a block 28 fixed to one end thereof. The block is formed with a slot 29 which embraces the arm 27 and is adjustably fixed against lengthwise movement by a screw 31.

The pendulum arm 27 is pivotally connected intermediate the ends thereof by means of a stud 32 of which the threaded shank 33 is received within an opening 34 of a transversely extending brace 36 which is fixed at its ends to the legs 19 of the casing. Threaded to the threaded shank 33 of the pivot stud 32 is a cylindrical sleeve 35 on the opposite end of which there is fastened as by a screw 37 a retainer plate 38. Encircling the cylindrical sleeve 35 is a coil spring 39 of which the ends 41 are crossed and formed with inwardly bent terminal ends 42. The inwardly bent ends 42 contact an upstanding stem 43 provided on the brace 36 and the opopsite sides of the pendulum arm 27 above the pivot stud 32. In this manner the pendulum 13 is restrained against swinging movement by the spring.

The spring 39 is selected to yield and permit swinging movement of the pendulum 28 only upon the application of a preselected acceleration on the mass to which the indicating device 10 is attached. In the application of the indicating device 10 to a cushioned under frame railway vehicle 20, the spring 39 would, for example, be selected to permit a swinging movement of the pendulum 13 at accelerations of about 10 x 32.2 ft./sec./sec., which acceleration would indicate the inoperativeness of the cushion unit 24.

Operatively connecting or latching the pendulum 13 to the indicating plate 12 is a latch retainer pin 46 which may be of substantially inverted triangular section with the base 47 disposed upwardly. The retainer pin engages along the base 47 the base 48 of a stop pin 49 which may also be of triangular section.

Holding the stop pin 49 in engagement with the retainer pin 46 is a leaf spring 51 which is fixed at its ends to abut against the upper ends of two blocks 52 fixed to the casing web 18 by bent ends 53 of straps 54 extending from a guide plate 55, overlying and fixed to the respective blocks 52. The guide plate 55 is spaced from the web 18 to provide a space in which the indicating plate 12 may freely move. Intermediate the ends, the leaf spring 51 abuts against the upper edge of the indicating plate 12 so as to exert a downward force thereon, causing the stop pin 49 to engage the retainer pin 46 on the pendulum 13.

Assuming now that an impact is applied on the railway vehicle 20 to which the indicating device 10 may be attached, if the cushion unit 24 is operative, the cushioning action thereof during lengthwise movement of the sliding sill 22 relative to the car body 23 will be such that the accelerations imposed on the latter will be below that causing the pendulum 13 to swing against the force of the spring 39. Thus, the indicating plate will be retained in its invisible position behind the casing web 18.

However, should the cushion unit 24 be inoperative, the substantially full force of the impact will be imparted to the car body 23 when the sill 22 has completed its travel so that the accelerations will exceed the safe or preselected limit. Under this condition the spring 39 will yield and the upper end of the pendulum arm 27 will swing so that the retainer pin 46 moves out of the path of the stop pin 49. This permits the indicator plate 12 to fall downwardly under the influence of gravity into alignment with the opening 16. To make the plate more visible when the latter is disposed over the opening, the forward face may be painted with any suitable color such as red or the like.

When the acceleration indicating device 10 of the present invention is used in a cushion underframe railway vehicle 20 to indicate the malfunctioning of the cushion unit 24 as above described, it is desirable that the indicating plate 12 remain in its warning position until the cushion unit 24 is repaired. To this end, there is incorporated in the indicating device 10 a tamperproof arrangement which comprises a substantially triangular plate 56 which is pivotally mounted on the casing web 18 by means of a strap 57 and a pin 58. The tamperproof plate is arranged so that as the indicating plate 12 moves downwardly, the stop pin 49 fixed thereto engages one of the sloping sides 59 and rocks the triangular plate 56 above the pivot 58 so that in the down or warning position of the indicating plate 12 the stop pin 49 is disposed below an arcuate base 61. In this position of the stop pin 49, the indicating plate cannot be elevated until the triangular plate 56 is rocked out of the path of movement thereof and this prevents inadvertent displacement of the indicating plate 12 upwardly. Access to the triangular plate 56 for rocking the latter is provided by a top cover plate 62 which is fastened to the casing 11 by a hinge 63. At its forward end the cover plate 62 is provided with a lip 64 having an opening 66 aligned with a complementary opening 67 formed in a lip 68 fixed to the outer face of the horizontal web 18. Inserted through the openings is a seal member 69. After the cushion unit has been repaired, the seal is broken and the triangular plate 56 is swung to one side and the indicating plate 12 is lifted upwardly so that the stop pin 49 is in engagement with the retainer pin 47 on the pendulum 13 and the acceleration indicating plate 12 is again in the upper invisible position designating the proper operation of the cushion unit.

What is claimed is:

1. A warning device for indicating the presence of an excessive acceleration applied on an object to which the device is adapted to be affixed, said warning device comprising a housing, pendulum mounting pivot means carried on the housing, a pendulum having a vertical arm pivotally carried by the pivot means intermediate the upper and lower ends of the pendulum arm, a weight mounted on the lower end of said arm, biasing means fixed relatively to the pivot means connected with said pendulum and resiliently resisting swinging movement of said pendulum at accelerations below a predetermined magnitude, a support in the form of retainer means mounted at the upper end of said pendulum arm, indicating means, stop means carried by said indicating means and supported by said retainer means, and means formed on said housing for guiding said indicating means in vertical movement between a raised position and a lowered position under the influence of gravity, whereby said stop means is engaged with said retainer means on said pendulum arm when said pendulum is in a substantially vertical position and is disengageable therefrom when said pendulum arm swings against the force of said biasing means about said pivot means whereby said indicating means is free to drop vertically to said lowered position indicating that excessive acceleration has occurred.

2. The invention according to claim 1, wherein said guide means includes a vertical wall disposed between said pendulum and said indicating means, said pendulum being swingable about a plane parallel to said vertical wall.

3. The invention according to claim 1, wherein said guide means includes a pair of vertical walls on either side of the indicating means, one of said walls forming a wall of the housing and being provided at its lower end with an aperture to view the indicating means in its lowered position.

4. The invention according to claim 1, and said indicating means including a generally vertical plate disposed between said pendulum and said housing.

5. The invention according to claim 1, and further biasing means engaging said indicating means and urging said indicating means downwardly toward said stop means so that said stop means engages said retainer means.

6. The invention according to claim 1, and antitampering means including a member pivotally mounted on said housing for swinging movement in a vertical plane, said member having lower portion positioned below said stop means, said lower portion being engageable with said stop means and rotated by said stop means as said indicating means is dropped to said lowered position, said lower portion overlying said stop means when said indicating means is located in said lowered position thereby to prevent return of said indicating means to said raised position until said member is pivoted out of the path of movement of said stop means.

7. The invention according to claim 6, and said device being provided with lock means in the form of a seal over portions of said housing adjacent said antitampering means to prevent entrance to said device for pivoting said member.

8. The invention according to claim 1, and said biasing means being mounted on said pivot means and engaging with said pendulum arm for limiting pivotal movement of said pendulum arm.

9. The invention as defined in claim 1 wherein said housing includes a vertical wall, and said pendulum is swingable about a plane parallel to said vertical wall, and wherein said indicating means is disposed between said pendulum and said vertical wall.

10. The invention as defined in claim 9 wherein said wall is formed with an opening through which said indicating means is visible when in said lowered position.

11. The invention as defined in claim 1 in which spring means normally bias said indicating means downwardly so that said stop means engages said retainer means.

References Cited

UNITED STATES PATENTS

| | | | |
|---|---|---|---|
| 1,868,365 | 7/1932 | Paul | 200—61.5 |
| 2,188,144 | 1/1940 | Eytman | 200—61.5 |
| 2,236,872 | 4/1941 | Grigsby | 200—61.5 |
| 2,825,297 | 3/1958 | Harrison | 116—114 |
| 2,880,408 | 3/1959 | Sewell | 116—37 |
| 3,248,538 | 4/1966 | McCauley et al. | 73—492 XR |
| 3,318,157 | 5/1967 | Browning et al. | 116—114 |

LOUIS J. CAPOZI, *Primary Examiner.*

U.S. Cl. X.R.

73—492; 200—61.45, 61.5